United States Patent [19]

Neal

[11] Patent Number: 5,605,264

[45] Date of Patent: Feb. 25, 1997

[54] BED SAVER TOOL BOX MOUNT

[76] Inventor: Gerald V. Neal, 107 Bartmess Dr., Lufkin, Tex. 75901

[21] Appl. No.: 498,504

[22] Filed: Jul. 5, 1995

[51] Int. Cl.⁶ .................................................. B60R 7/60
[52] U.S. Cl. ................................. 224/404; 296/37.6
[58] Field of Search .............................. 224/402, 403, 224/404, 539, 542, 543, 550, 551, 545, 547, 32 R, 321; 296/37.1, 37.6; 211/905.3; 248/200.1, 295.11, 298.1

[56] References Cited

U.S. PATENT DOCUMENTS

| | | | |
|---|---|---|---|
| 2,543,202 | 2/1951 | Robinson | 224/551 |
| 2,889,097 | 6/1959 | Broehl. | |
| 3,385,488 | 5/1968 | Bronson | 224/321 |
| 3,912,139 | 10/1975 | Bowman | 224/403 |
| 4,635,992 | 1/1987 | Hamilton et al. | 296/3.76 |
| 4,681,360 | 7/1987 | Peters et al. | 296/37.6 |
| 4,718,583 | 1/1988 | Mullican | 224/404 |
| 4,767,149 | 8/1988 | Rye | 224/403 |
| 4,830,242 | 5/1989 | Painter. | |
| 4,898,284 | 2/1990 | Arens | 296/37.6 |
| 5,044,682 | 9/1991 | Wayne. | |
| 5,052,737 | 10/1991 | Farmer, Jr.. | |
| 5,083,828 | 1/1992 | Accettura. | |
| 5,088,636 | 2/1992 | Barajas. | |
| 5,092,504 | 3/1992 | Hannes et al.. | |
| 5,118,156 | 6/1992 | Richard | 296/37.6 |
| 5,121,959 | 6/1992 | King. | |
| 5,257,850 | 11/1993 | Brim. | |
| 5,263,757 | 11/1993 | Reed. | |
| 5,368,210 | 11/1994 | Wotring | 224/404 |

FOREIGN PATENT DOCUMENTS 5221358 8/1993 Japan ................................. 224/32 R Primary Examiner—Henry J. Recla
Assistant Examiner—Gregory M. Vidovich
Attorney, Agent, or Firm—Sue Z. Shaper; Butler & Binion, L.L.P.

[57] ABSTRACT

Apparatus and method for anchoring a tool box to a pick-up truck bed utilizing struts attaching between opposing sidewall portions of the truck bed such that the box is anchored out of contact with truck bed surfaces.

10 Claims, 2 Drawing Sheets

BED SAVER TOOL BOX MOUNT

BACKGROUND OF INVENTION

FIELD OF THE INVENTION

This invention relates to mounting means for tool boxes for a pick-up truck bed.

Current means on the market to mount tool boxes in a pick-up truck bed frequently result in damage to the truck. They do not anchor the box off the surface of the truck bed bottom and/or off the top surface of the bed side rails. Contact between the tool box and the side rails and/or bed bottom results in a scratching of paint, denting and rusting, as well as an inability to easily clean the bed of the truck.

The advantage of the present invention is that it anchors a tool box off the surface of the truck bed, eliminating the rust and scratching of paint. The device holds the tool box above the top of the side rails also. One additional result is that it is easy to wash and wax and keep the area under the box clean.

An auxiliary advantage of the invention adheres in the struts that mount the box against portions of the truck bed sidewalls. Since a box is usually mounted next to the cab, these struts reinforce the truck bed sidewall structure adjacent the cab in case of accident.

The two three-part struts that comprise the preferred embodiment of the present invention are attractive, simple to adjust to variable truck widths and easy to install.

SUMMARY OF THE INVENTION

The present invention comprises apparatus for anchoring a tool box to a pick-up truck bed. Two struts are each attached to the box and each extended between and attached to opposing sidewall portions of the truck bed. The struts are positioned against the truck bed walls such that the box, while anchored substantially within the truck bed space defined by the bed sidewalls, is out of contact with the bed bottom surface.

Preferably the box is anchored such that it remains out of contact with the truck bed side rail top surfaces and the struts, as well, remain out of contact with the truck bed side rail top surfaces.

Preferably each strut is adjustable for adjusting the varying truck bed widths. In the preferred embodiment a strut comprises three angle iron sections. The box is attached to a first middle section. The second and third end sections adjustably attach to the middle section. The end sections have a piece adapted to attach against a truck bed sidewall portion.

The invention includes a method for anchoring a tool box to a pick-up truck bed comprising attaching the box to two struts and attaching one end of each strut to an opposing sidewall portion of a truck bed wall. The struts are attached such that the box is anchored substantially within the space defined by the truck bed sidewalls but out of contact with the truck bed bottom surface. Preferably the box is anchored out of contact with the truck bed side rail top surfaces.

The method includes adjusting the length of variably adjustable struts to match different truck bed widths.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF PREFERRED EMBODIMENTS

Figure 1A:
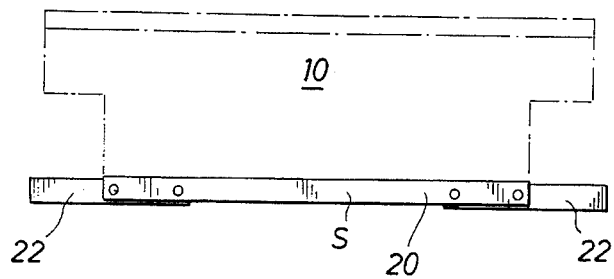
FIG. 1A provides a side view of a tool box and a three-part strut.
Figure 1B:
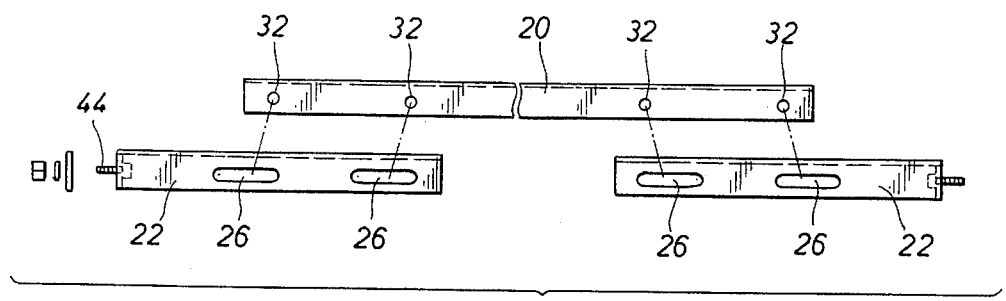
FIG. 1B offers a perspective view of one side of a strut.
Figure 1C:
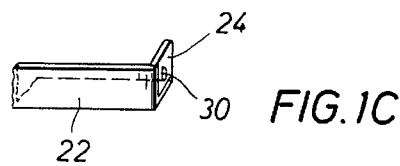
FIG. 1C offers a bottom view of a three piece strut.

FIG. 1 illustrates tool box 10 and composite strut S. Tool box 10 is attached to composite strut S using two bolts 42 that bolt a portion of the bottom of tool box 10 into one section, in the preferred embodiment, of an angle iron that comprises composite strut S.

Composite strut S, as illustrated in FIG. 1, is comprised of a first middle section 20 and second and third end sections 22 of angle iron. Middle section 20 is adjustably attached to end sections 22 by means of slots 26 and holes 32, through which a bolt and nut is affixed. Flat pieces 24 are welded to the ends of angle iron end sections 22. Flat pieces 24 contain holes 30. Screw 44, with its accompanying washer and nut, attaches composite strut S to a sidewall portion of a pick-up truck bed through hole 30.

Figure 2:
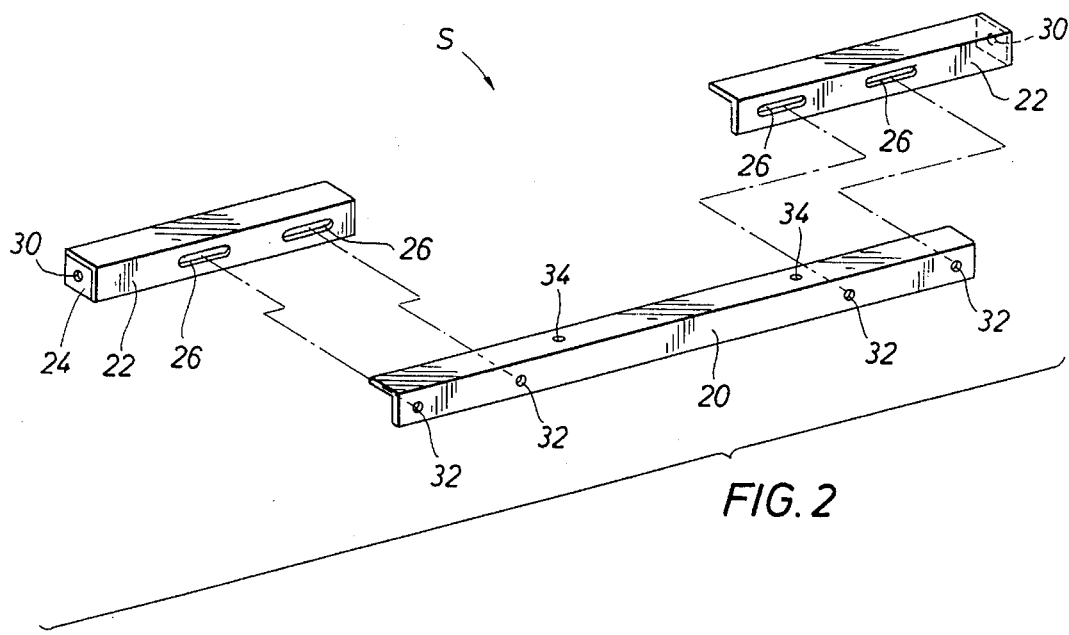
FIG. 2 illustrates a three-part strut in detail.

FIG. 2 illustrates a preferred embodiment of strut S. In the preferred embodiment strut S comprises central section 20 and end sections 22. Each section of strut S is preferably comprised of angle iron. End sections 22 have end pieces 24 welded to each end in order to secure attachment of the composite strut to sidewall portions of a truck bed. FIG. 2 also illustrates holes 34 by means of which composite strut S is affixed to tool box 10.

Figure 3:
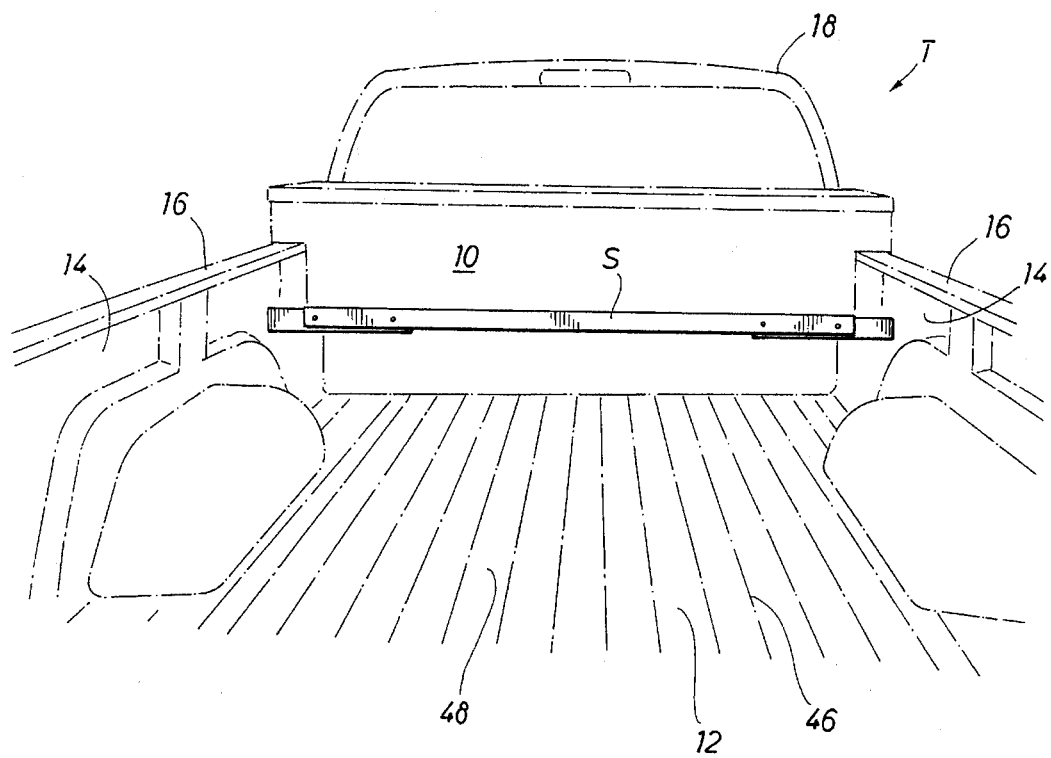
FIG. 3 illustrates the mounting of the tool box in a truck bed giving an end view.
Figure 4:
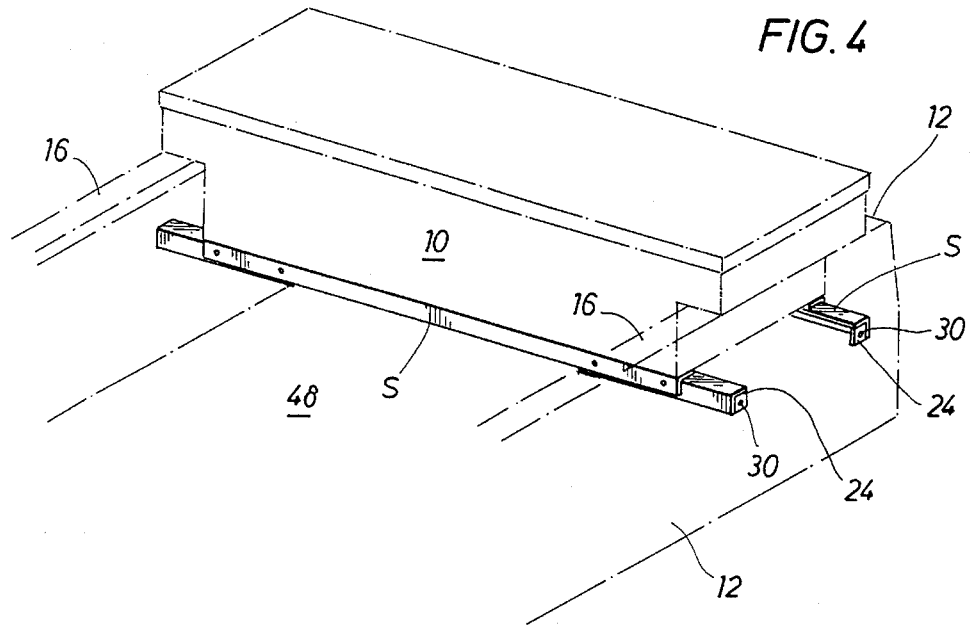
FIG. 4 illustrates the mounting of a tool box in a truck bed from a side elevation view.

FIG. 3 illustrates tool box 10 attached to bed 12 of truck T. FIG. 4 illustrates box 10 attached by means of a pair of struts S to portions of sidewall 14 of bed 12. Struts S are designed to be affixed to portions of sidewall 14 of bed 12 such that box 10, while being anchored substantially within the space 46 defined by the truck bed walls, does not come into contact with the bottom surface 48 of bed 12 or surface areas of sidewalls 14, including in particular the side rail top surface 16 of the truck bed. The only contact between the box and the truck bed occurs through strut S at portions of sidewall 14 where strut end sections 24 are bolted to portions of the sidewall. Strut S, in the preferred embodiment, does not contact the bottom 48 of the bed or side rail top surface 16.

The foregoing disclosure and description of the invention are illustrative and explanatory thereof. Various changes in the size, shape and materials as well as the details of the illustrated construction may be made without departing from the spirit of the invention.

What is claimed is:

1. Apparatus for anchoring a tool box to a pick-up truck bed having opposing sidewall portions and a bottom surface extending therebetween wherein the opposing sidewall portions and the bottom surface define a truck bed space, said apparatus comprising:

a truck tool box;

two struts, each attached to said box and each extending between and adapted to be attached to the opposing sidewall portions of the truck bed;

wherein said box is anchored substantially within the truck bed space while out of contact with the bottom surface of the truck bed.

2. The apparatus of claim 1 wherein said two struts are adapted to be attached to the opposing sidewall portions such that said box is anchored out of contact with side rail top surface of each of the opposing sidewall portions.

3. The apparatus of claim 1 wherein said two struts are adapted to be attached to the opposing sidewall portions such that said struts are out of contact with a side rail top surface of each of the opposing sidewall portions.

4. The apparatus of claim 1 wherein each said strut compromise adjustable struts for adjusting to varying truck bed widths.

5. The apparatus of claim 1 wherein each said strut comprises three angle iron sections and wherein a second angle iron section and a third angle iron section each have an end piece adapted to attach against the opposing sidewall portions, respectively, and a slot for adjustable attaching to said first section.

6. A method for anchoring a tool box to a pick-up truck bed having opposing sidewall portions and a bottom surface extending therebetween wherein the opposing sidewall portions and the bottom surface define a truck bed space, said method comprising:

attaching a truck bed tool box to two struts, said each strut having two opposing ends;

attaching said two opposing ends of each said strut to the opposing sidewall portions of the truck bed, respectively, such that said box is anchored substantially within the truck bed space while out of contact with the bottom surface of the truck bed.

7. The method of claim 6 wherein attaching said opposing ends of each said strut includes attaching such that said box is anchored out of contact with a side rail top surface of each of the opposing sidewall portions.

8. The method of claim 6 wherein attaching said two opposing ends of each said strut includes attaching such that said struts are out of contact with a side rail top surface of each of the opposing sidewall portions.

9. The method of claim 6 that includes adjusting a strut length of each said strut to match the truck bed width.

10. The method of claim 6 wherein attaching said bod to each said strut includes respectively attaching said box to a first section of angle iron of each said strut, adjustably attaching a second section of angle iron to said first section of each said strut and adjustably attaching a third section of angle iron to said first section of each said strut wherein said second and third sections of each said strut are adjusted such that each said strut has a width suitable to attach to the opposing sidewall portions.

* * * * *

UNITED STATES PATENT AND TRADEMARK OFFICE
CERTIFICATE OF CORRECTION

PATENT NO. : 5,605,264

DATED : February 25, 1997

INVENTOR(S) : Gerald V. Neal

It is certified that error appears in the above-identified patent and that said Letters Patent is hereby corrected as shown below:

Claim 10 Line 15   After said delete bod and insert —box—

Signed and Sealed this

Fifteenth Day of April, 1997

Attest:

BRUCE LEHMAN

Attesting Officer

Commissioner of Patents and Trademarks